Jan. 2, 1951         C. SCHAUB         2,536,313
WHEEL PAIR FOR RAILWAY CARS
Filed March 22, 1947
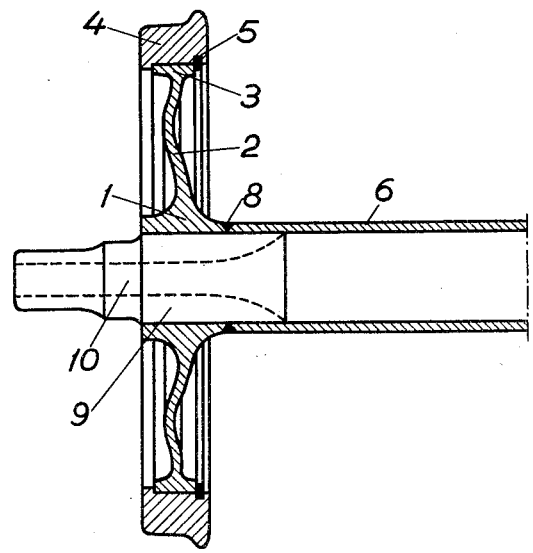
Inventor
Cyrill Schaub.
By James Aiken
Attorney.

Patented Jan. 2, 1951

2,536,313

UNITED STATES PATENT OFFICE 2,536,313

WHEEL PAIR FOR RAILWAY CARS

Cyrill Schaub, Vasteras, Sweden, assignor to Allmanna Svenska Elektriska Aktiebolaget, Vasteras, Sweden, a Swedish corporation Application March 22, 1947, Serial No. 736,556
In Sweden April 1, 1946

1 Claim. (Cl. 295—36)

During recent years many attempts have been made to achieve a light and reliable design of wheels and wheel axles for railway cars. These designs have to a large extent been based on electrical welding. In spite of the development of the electrical welding methods, the use of welding joints involves considerable danger, chiefly because such axles are exposed to fatigue and impact stresses, and the welding joints have proved to cause a decrease in the fatigue strength of the material.

The present invention has for its object a railway wheel pair, which is assembled chiefly by welding, the welding joints, however, being so arranged that they are not exposed to any considerable stresses. By the invention also corrosion failures are avoided, which have hitherto been so fatal in the common designs.

According to the invention the two wheels of the wheel pair are joined with each other by means of a shaft in the form of a pipe, which is welded to the two naves either by arc- or resistance welding, journals being shrunk into the naves, which journals project across the welding joints between the wheels and the axle, said journals exactly fitting not only the bores of the naves but also the axle in the form of a pipe. Due to the fact that the said journals project across the said welding joints, the stresses on these are considerably relieved. For this purpose the journals must project a certain distance into the axle, suitably a distance equal to half the inner diameter of the axle.

In order to decrease the risk of formation of corrosion grooves on the inner surface of the axle in the form of a pipe, the inner ends of the journals are inwardly bevelled so that radial stresses due to the shrinkage are gradually decreased. The journals may either be in the form of pipes or solid, but in the latter case they are provided with a bore at the inner end, the edge of this bore being bevelled so that the thickness of the wall continually decreases towards the end.

Due to the fact that according to the invention the journals are not attached to the wheel pair by welding but only shrunk, they need not be made from a material which can be welded, so that full liberty exists to choose the material which is most favorable with respect to the bending stresses.

On the accompanying drawing one end of such a wheel pair is shown, where 1 designates the nave of the wheel and 2 its centre. 3 designates the felloe, on which the rim 4 is shrunk and secured by keys 5. The wheel nave 1 with the center 2 and felloe 3 are suitably made from one piece. The axle 6 is welded to the nave 1 by means of the welding joint 8 and through the nave and into one end of the axle 6 a journal 9 projects, which is provided with a bore 10, the diameter of which successively increases toward the inner end, so that the wall of the journal at the inner end is very thin.

As above mentioned it is not necessary that the journal be provided with a bore extending through the whole length, but it is sufficient that the inner end is provided with a bore, which at the inner end of the journal is bevelled, so that the wall here becomes rather thin, which is necessary with respect to avoiding corrosion grooves on the inner surface of the axle.

I claim as my invention:

A railway car wheel and axle assembly comprising an axle, a bore in each end of the axle, a wheel nave at each end of the axle, a bore in each nave, an annular butt-welded joint between each end of the axle and nave, a journal extending inwardly through the bore of each nave and extending into the bore in the axle for a distance equal to at least half the diameter of said axle bore, said bores in the nave and in the axle ends being of equal diameter, and said journals being accurately dimensioned to closely fit the bores of the naves and of the axles and being shrunk into such bores.

CYRILL SCHAUB.

REFERENCES CITED

The following references are of record in the file of this patent:

UNITED STATES PATENTS

| Number | Name | Date |
| --- | --- | --- |
| 1,357,226 | Davis | Nov. 2, 1920 |
| 1,902,910 | Oelkers | Mar. 28, 1933 |
| 2,041,162 | Buckwalter | May 19, 1936 |

FOREIGN PATENTS

| Number | Country | Date |
| --- | --- | --- |
| 639,418 | Germany | Nov. 29, 1933 |